United States Patent
Belinky et al.

(10) Patent No.: US 10,953,713 B2
(45) Date of Patent: Mar. 23, 2021

(54) TOWBAR WITH A HITCH ADAPTOR SYSTEM

(71) Applicant: HORIZON GLOBAL AMERICAS INC., Plymouth, MI (US)

(72) Inventors: Jacob Belinky, Carleton, MI (US); Yung-Hao Kung, Plymouth, MI (US); Russell Brzezinski, Berkley, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 191 days.

(21) Appl. No.: 16/175,015

(22) Filed: Oct. 30, 2018

(65) Prior Publication Data

US 2019/0126700 A1 May 2, 2019

Related U.S. Application Data

(60) Provisional application No. 62/578,764, filed on Oct. 30, 2017.

(51) Int. Cl.
| | |
|---|---|
| *B60D 1/52* | (2006.01) |
| *B60D 1/06* | (2006.01) |
| *B60D 1/145* | (2006.01) |
| *B60D 1/07* | (2006.01) |
| *B60D 1/48* | (2006.01) |

(52) U.S. Cl.
CPC .............. *B60D 1/52* (2013.01); *B60D 1/06* (2013.01); *B60D 1/075* (2013.01); *B60D 1/145* (2013.01); *B60D 1/485* (2013.01)

(58) Field of Classification Search
CPC .......... B60D 1/145; B60D 1/485; B60D 1/52; B60D 1/06; B60D 1/075; B22D 25/00
See application file for complete search history.

(56) References Cited

U.S. PATENT DOCUMENTS

| | | | |
|---|---|---|---|
| 5,184,840 A | 2/1993 | Edwards | |
| 5,277,448 A * | 1/1994 | Colibert | B60D 1/485 280/491.5 |
| 5,620,198 A * | 4/1997 | Borchers | B60D 1/52 280/491.5 |
| 5,908,201 A | 6/1999 | Van Vleet | |
| 6,089,431 A | 7/2000 | Heyworth | |

(Continued)

FOREIGN PATENT DOCUMENTS

| | | |
|---|---|---|
| DE | 102011009306 | 7/2012 |
| DE | 202013009204 | 1/2015 |

OTHER PUBLICATIONS

International Searching Authority, European Patent Office, International Search Report and Witten Opinion for International App. No. PCT/US2018/058182 dated Feb. 11, 2019.

(Continued)

*Primary Examiner* — Tony H Winner
*Assistant Examiner* — Michael R Stabley
(74) *Attorney, Agent, or Firm* — McDonald Hopkins LLC

(57) ABSTRACT

A towbar with a hitch adaptor system incorporating a detachable receiving member and a detachable hitch ball is shown and described. The towbar with a hitch adaptor system may include a linkage member, a connecting member, a coupler and a receiver member. The receiver member may also include a detachable receiving hitch and a detachable hitch ball.

26 Claims, 18 Drawing Sheets

(56) References Cited

U.S. PATENT DOCUMENTS

| | | | | |
|---|---|---|---|---|
| D433,357 S | * | 11/2000 | McCoy | D12/162 |
| 6,173,984 B1 | * | 1/2001 | Kay | B60D 1/145 |
| | | | | 280/491.5 |
| 6,428,031 B1 | * | 8/2002 | McCoy | B60D 1/075 |
| | | | | 224/519 |
| 6,578,864 B2 | * | 6/2003 | McCoy | B60D 1/485 |
| | | | | 280/491.5 |
| 7,100,936 B1 | * | 9/2006 | Cheng | B60D 1/485 |
| | | | | 280/491.5 |
| 7,114,741 B2 | * | 10/2006 | Marvin L. | B60D 1/485 |
| | | | | 280/495 |
| 7,690,672 B2 | * | 4/2010 | Scruggs | B60D 1/52 |
| | | | | 280/491.2 |
| 8,328,224 B1 | † | 12/2012 | Alsaid | |
| 9,457,633 B2 | * | 10/2016 | Krieger | B21D 5/015 |
| 9,731,569 B2 | * | 8/2017 | McGuckin | B60D 1/488 |
| 9,738,126 B2 | * | 8/2017 | Mantovani | B60D 1/485 |
| 2002/0084622 A1 | | 7/2002 | Hansen | |
| 2002/0140206 A1 | | 10/2002 | Lloyd | |
| 2003/0015856 A1 | | 1/2003 | Hancock | |
| 2003/0090085 A1 | * | 5/2003 | Seksaria | B60D 1/485 |
| | | | | 280/495 |
| 2004/0021295 A1 | * | 2/2004 | Westerdale | B60D 1/485 |
| | | | | 280/495 |
| 2004/0222614 A1 | | 11/2004 | Lindenman | |
| 2007/0290483 A1 | * | 12/2007 | Visser | B60D 1/60 |
| | | | | 280/507 |
| 2009/0189368 A1 | | 7/2009 | Smith | |
| 2010/0109286 A1 | * | 5/2010 | Visser | B60D 1/52 |
| | | | | 280/477 |
| 2018/0056739 A1 | † | 3/2018 | Robinson | |
| 2019/0070917 A1 | † | 3/2019 | Nance | |

OTHER PUBLICATIONS

International Searching Authority, European Patent Office, International Search Report and Witten Opinion for International App. No. PCT/EP2016/063956 dated Sep. 19, 2016.

\* cited by examiner

† cited by third party

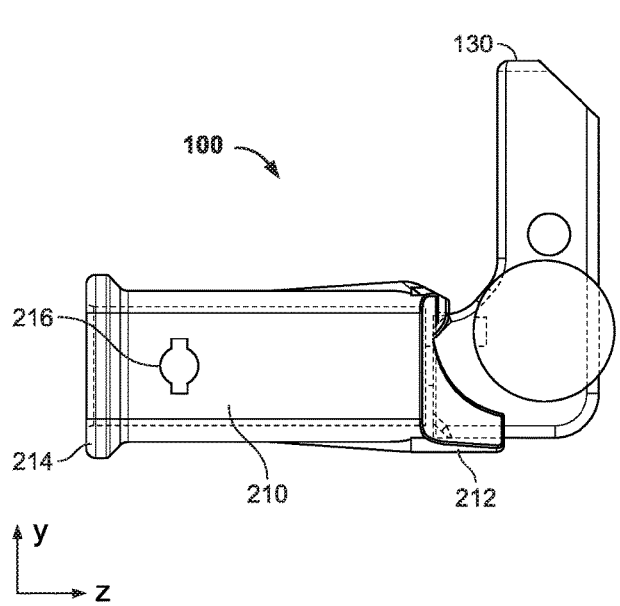
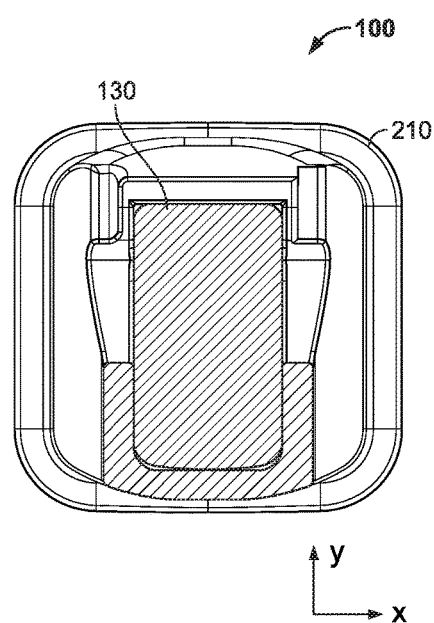
FIG. 3D
FIG. 3E

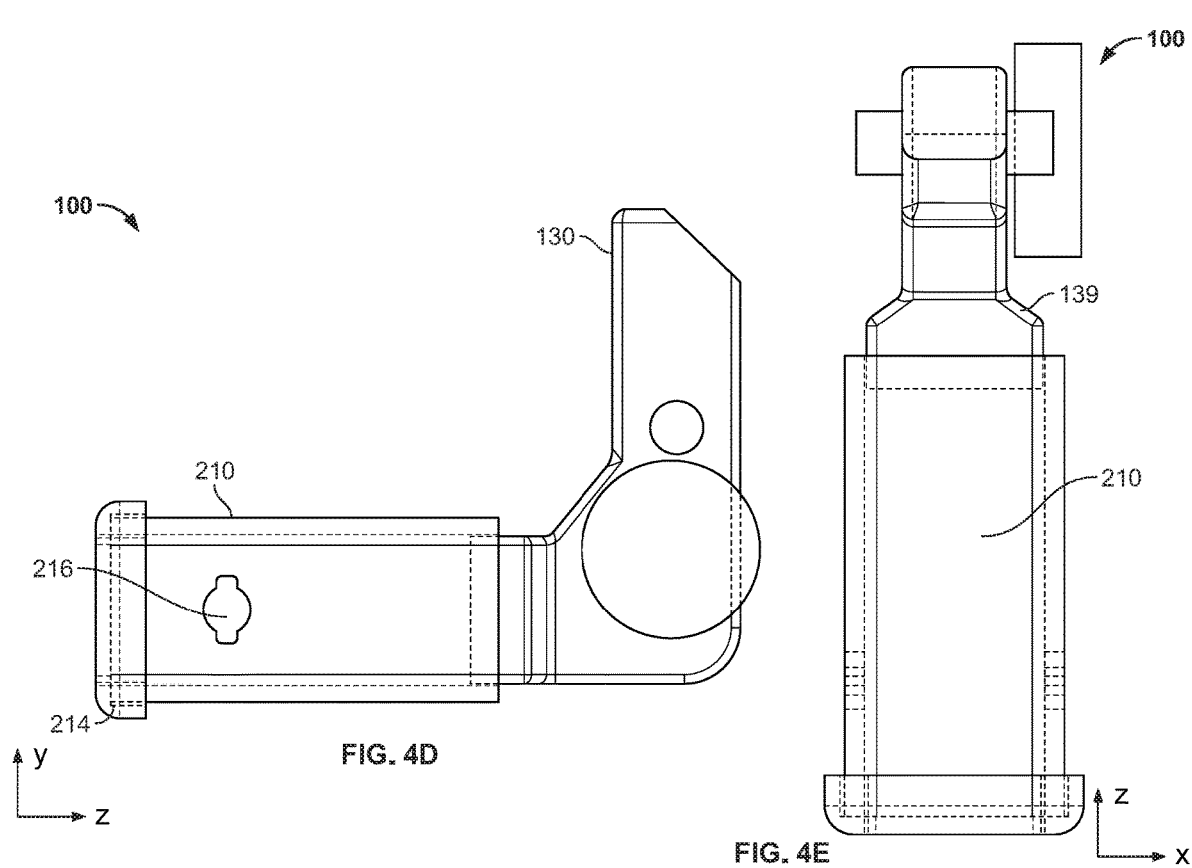

FIG. 10A
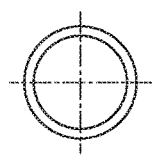 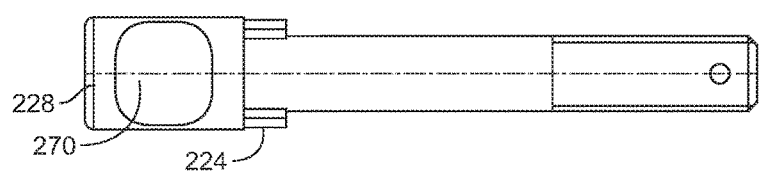 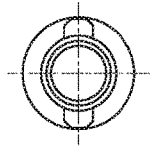
FIG. 10B    FIG. 10C

TOWBAR WITH A HITCH ADAPTOR SYSTEM

CROSS-REFERENCE TO RELATED APPLICATION

This application claims priority to U.S. Provisional Patent Application No. 62/578,764 entitled, "TOWBAR WITH A HITCH ADAPTOR SYSTEM," filed on Oct. 30, 2017, which is incorporated herein by reference in its entirety.

FIELD OF THE INVENTION

The present invention is generally related to a towbar with a hitch adaptor system and, more particularly, to a towbar with a hitch adaptor system incorporating a detachable receiving member and a detachable hitch ball.

BACKGROUND

A towbar with a hitch adaptor system is often used in association with towed vehicles, such as trailers. The towbar with a hitch adaptor system may be utilized to operatively connect a towing vehicle with a towed vehicle. The towed vehicle may include a coupler that operatively engages with the hitch ball of the towbar. This engagement may allow the towing vehicle to tow the towed vehicle. The engagement of the coupler with the hitch ball may allow the towing vehicle to rotate relative to the towed vehicle and vice versa as is known in the art The coupler and the hitch ball are also widely used for coupling trailers to tow vehicles. Generally, the hitch ball is securely mounted to the rear of the tow vehicle and the coupler is mounted on the trailer tongue. However, there are certain types of equipment which do not utilize the coupler and the hitch ball in which the coupler or the hitch ball may need to be replaced. However, the replacement may be time consuming and since tow vehicles are normally used to tow a wide variety of trailer types, such a conversion is frequently necessary. Such repeated changeover of equipment is undesirable since it presents an increased likelihood of damage to the coupling elements or a mistake in attaching the hitch ball to the rear of the tow vehicle.

Also, the coupler and the hitch ball may be used in applications for SUV's or other vehicles where there is a demand for both aesthetics as well as functional towing. Such application may require the coupler and the hitch ball not to be shown when those are not in use.

Therefore, there is a need for an improved towbar with a hitch adaptor system having detachable members or retractable members that are convenient for the user, that may require less space, and that me be both aesthetic as well as functional.

SUMMARY

In one embodiment, the present invention relates to a towbar with a hitch adaptor system. In another embodiment, there is provided a towbar with a hitch adaptor system that includes a detachable receiving member and a detachable hitch ball. The towbar with a hitch adaptor system may include a linkage member, a connecting member, a coupler and a receiver member. The receiver member may also include a detachable receiving hitch and a detachable hitch ball.

BRIEF DESCRIPTION OF THE DRAWINGS

Operation of the present teachings may be better understood by reference to the detailed description taken in connection with the following illustrations. These appended drawings form part of this specification, and written information in the drawings should be treated as part of this disclosure. In the drawings:

FIG. 3D is a perspective view of the coupler and one embodiment of a receiver member of the embodiment of FIG. 3A;

FIG. 3E is a cross sectional view of the embodiment of FIG. 3D;

FIG. 4D is a perspective view of the coupler and another embodiment of the receiver member of the embodiment of FIG. 4A;

FIG. 4E is a top view of the embodiment of FIG. 4D;

FIGS. 10A-10C are exemplary views of one embodiment a pin of the pin assembly;

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

It is noted that the various embodiments described herein may include other components and/or functionality, such those from other described embodiments herein. It is further noted that while various embodiments refer to a towbar with a hitch adaptor system, various other systems may be utilized in view of embodiments described herein. Further, the present system may include a variety of components, not limited to the components discussed below. Optionally, the present system may include multiple units of the same components. In an embodiment, the present system may include just the towbar with a hitch adaptor system described herein. Further, the present system may include components of each of the towbar with a hitch adaptor system to create a combination of each feature of the various systems.

Figure 1:
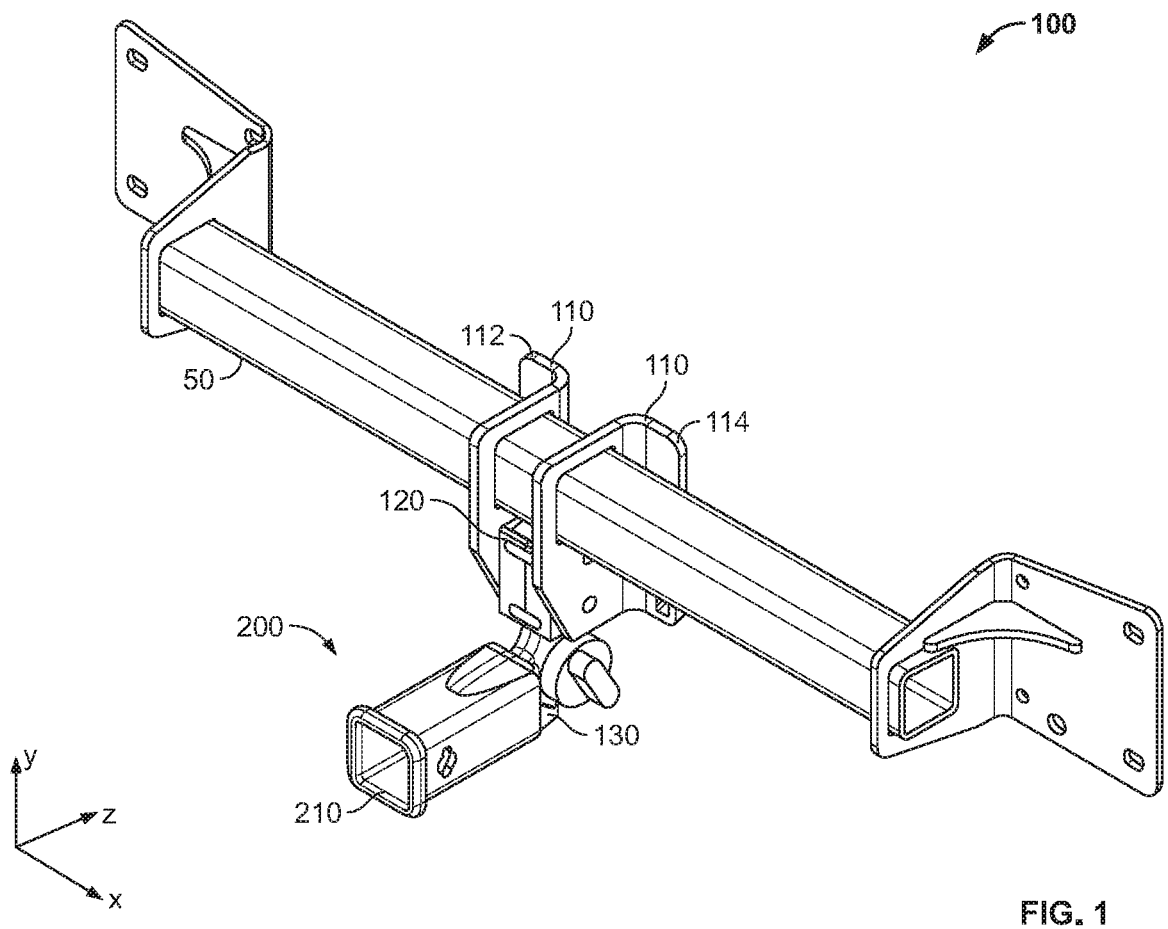
FIG. 1 is a perspective view of a towbar with a hitch adaptor system incorporating a detachable receiving member in accordance with one embodiment of the present disclosure.

FIG. 1 illustrates a non-limiting exemplary embodiment of a towbar with a hitch adaptor system 100 as shown and described herein. The towbar 50 may be operatively attached with a towing vehicle (not shown) in any appropriate manner. For example, the towbar 50 may be attached to a frame of the towing vehicle, such as being welded thereto or being attached with fasteners. The present teachings are not limited to any specific configuration. Further still, the towbar 50 may be attached integrally or monolithically formed with the frame of the towing vehicle. Further, a hitch adaptor system 100 may be secured to the towbar 50. The hitch adaptor system 100 may be secured to the towbar 50 by any appropriate means, such as with fasteners, welding or the like.

Figure 2:
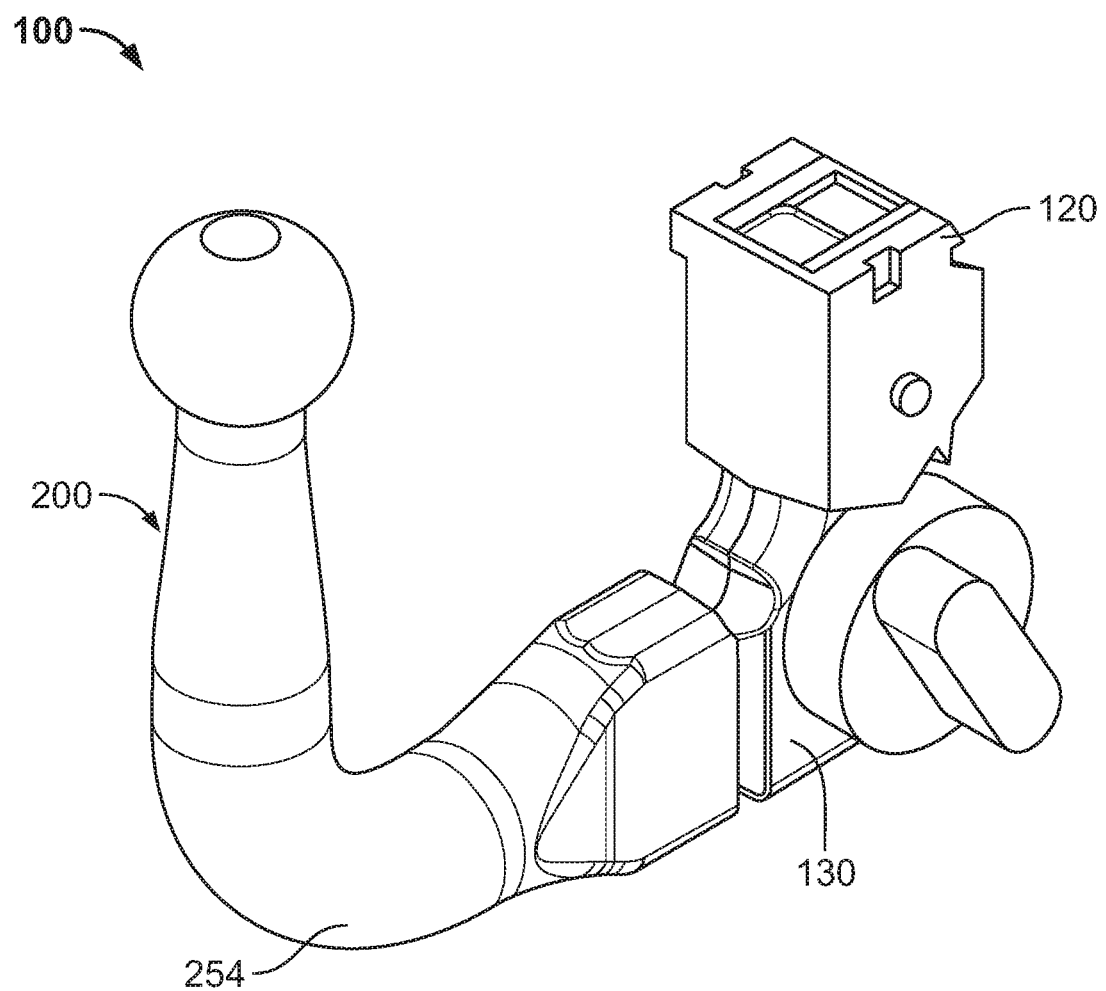
FIG. 2 is a perspective view of a connecting member and a coupler of the embodiment of FIG. 1.

The hitch adaptor system 100 may include a linkage member 110, a connecting member 120, a coupler 130 and a detachable receiving device 200. The detachable receiving device 200 may include a receiving member 210 (as shown in FIG. 1) or a hitch ball member 250 (as shown in FIG. 2) as various different types of detachable receiving devices 200 are contemplated by this disclosure. The linkage member 110 may be operatively secured to the towbar 50 in any appropriate manner and may be secured with the connecting member 120 in any appropriate manner.

In a non-limiting example, the linkage member 110 may include first and second plates 112, 114. The first and second plates 112, 114 may also be attached to the connecting member 120 such as for example using fasteners. In a non-limiting example, a pair of fasteners (not shown) may be inserted into and through the first plate 112 through the connecting member 120 and through the second plate 114. This may fixedly secure the linkage member 110 with the connecting member 120. While fasteners are described as securing the linkage member 110 with the connecting member 120, the present teachings are not limited to such—the linkage member 110 may be attached with the connecting member 120, such as welding, adhesives, or any other suitable method.

The first and second plates 112, 114 may be of any appropriate shape and size. The first and second plates 112, 114 may be of a generally rectangular shape, but may be of any appropriate shape, including, without limitation, circular, non-circular, square, polygonal, triangular, oval or a combination of such. The first and second plates 112, 114 may be of any configuration and positioned in any appropriate location, including, without limitation on the towbar 50. The first and second plates 112, 114 may include apertures or openings that receive the towbar 50 therethrough and may be positioned along the towbar 50 at a desired location where it may be fastened to the towbar 50. The first and second plates 112, 114 may help ensure that the connecting member 120 is securely attached to the towbar 50.

As shown in FIG. 2, the connecting member 120 and the detachable receiving device 200 may be coupled together by the coupler 130. A particular embodiment shown in FIG. 2 is the hitch ball member 250. The coupler 130 may be rigidly mounted to the connecting member 120 via a permanent or selectively detachable connection.

Figure 3A:
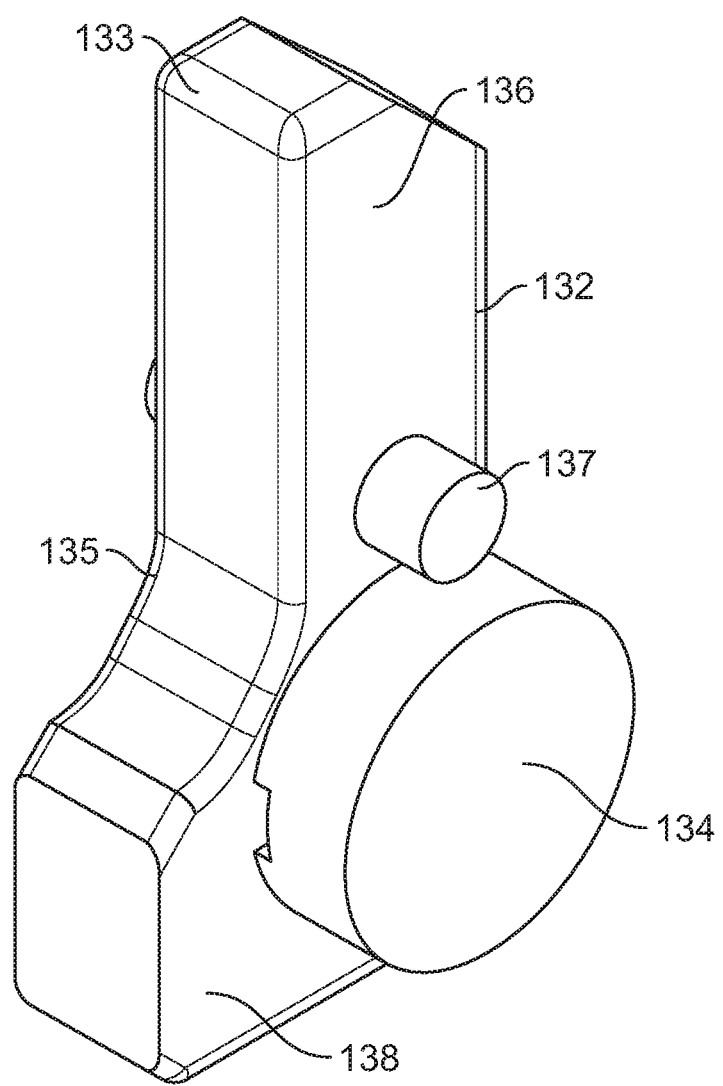
FIG. 3A is a perspective view of one embodiment of the coupler of the embodiment of FIG. 1.
Figure 3B:
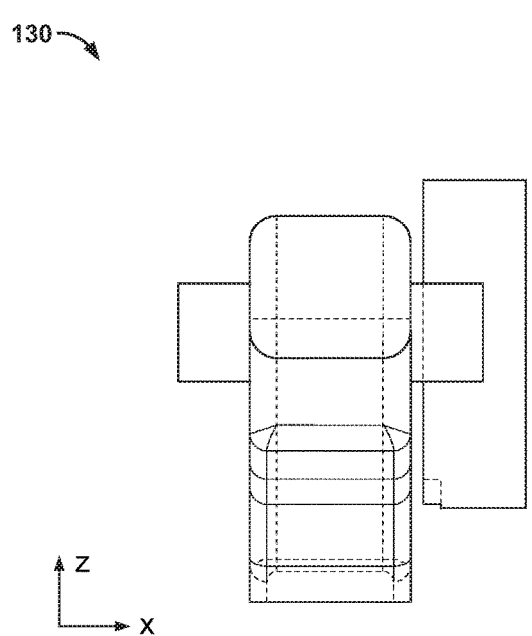
FIG. 3B is a top view of the coupler of the embodiment of FIG. 3A.
Figure 3C:
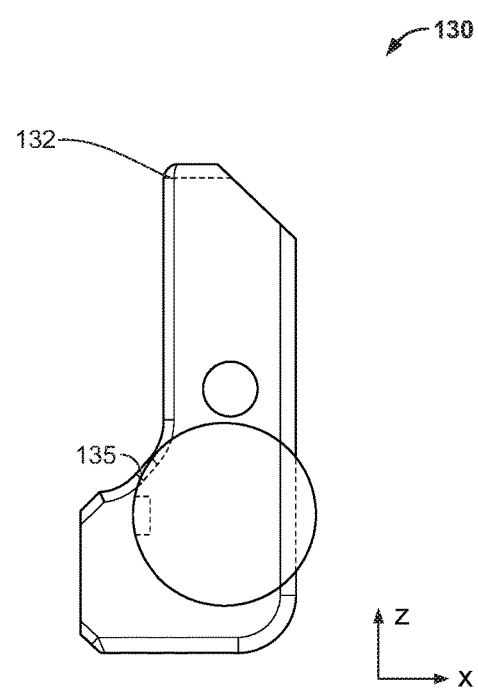
FIG. 3C is a side view of the coupler of the embodiment of FIG. 3A.
Figure 4A:
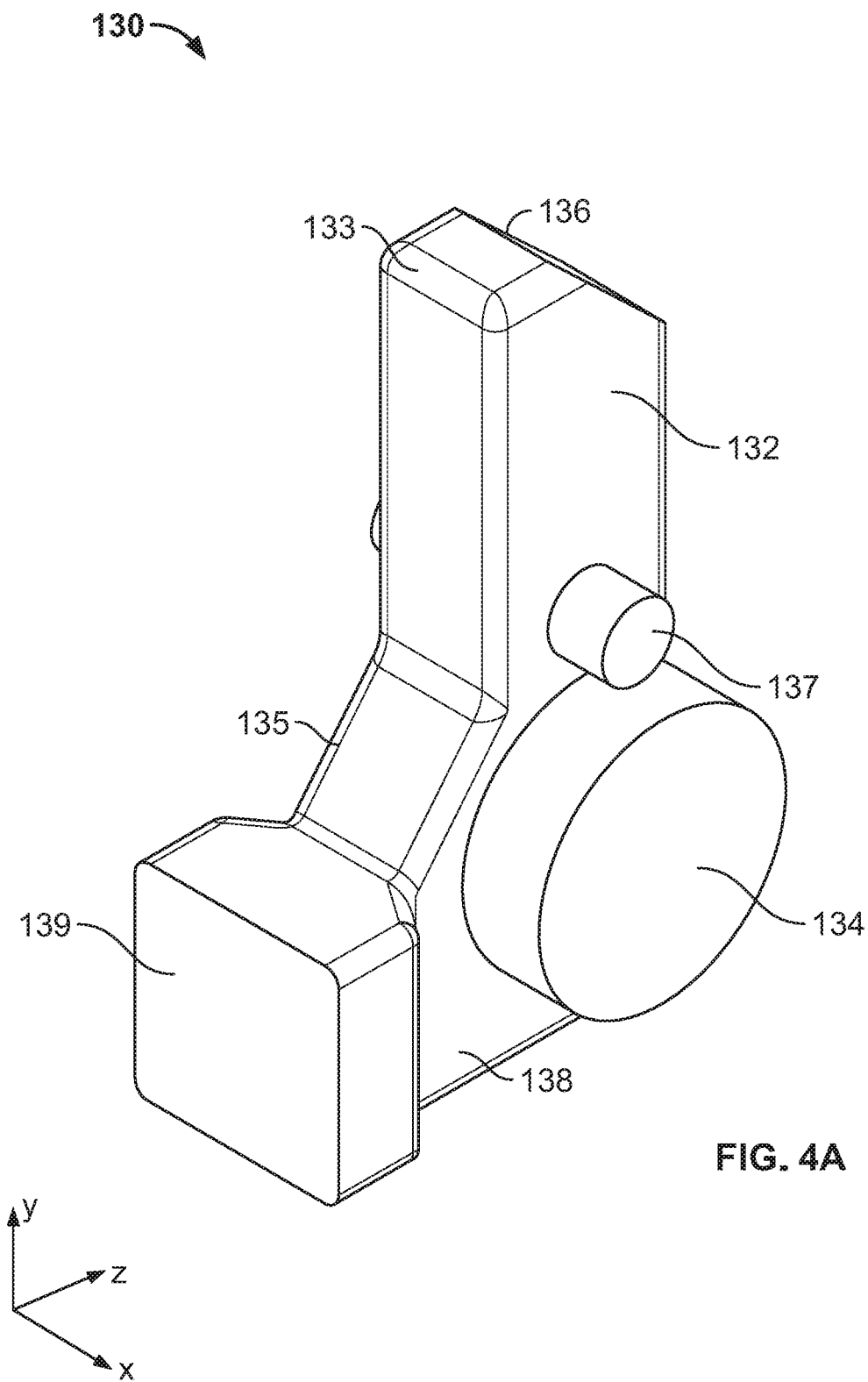
FIG. 4A is a perspective view of alternative embodiment of the coupler of the embodiment of FIG. 1.
Figure 4B:
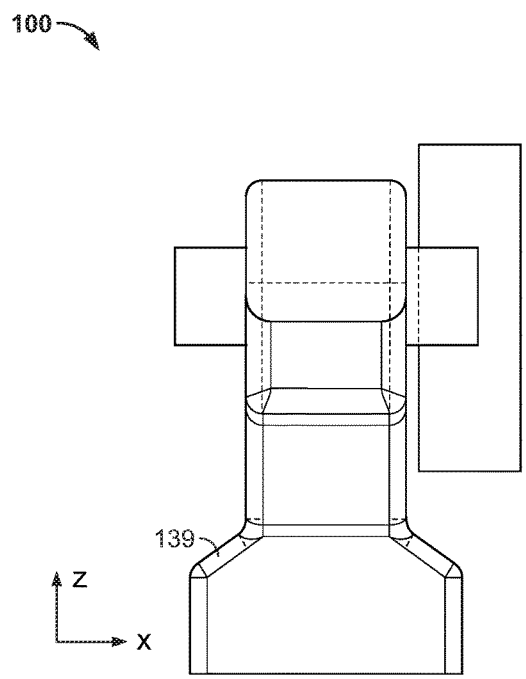
FIG. 4B is a top view of the coupler of the embodiment of FIG. 4A.
Figure 4C:
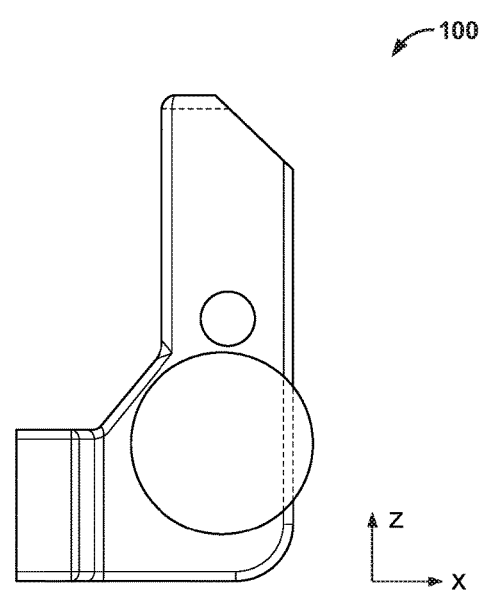
FIG. 4C is a side view of the coupler of the embodiment of FIG. 4A.

As shown in FIG. 3A, the coupler 130 may include a coupler body 132 and a knob 134. The coupler body 132 may also include an attachment portion 136 and a receiving portion 138. The attachment portion 136 may be selectively coupled to the connecting member 120. The receiving portion 138 may be selectively coupled to the receiving member 210. The coupler body 132 may have a generally L-shaped configuration to allow the attachment portion 136 to be positioned generally perpendicular to the receiving portion 138.

The attachment portion 136 may include at least one locking member 137 that may be toggled between a locked position and an unlocked position. In one embodiment, the at least one locking member 137 may be a ball bearing that at least partially extends from a surface of the attachment portion 136 in the locked position and is recessed or retractable from the surface of the attachment portion 136 in the unlocked position. Further, the locking member 137 may be at least one of a peg, protrusion, pin, or fastener to allow for the selective locking of the coupler 130 to the connecting member 120.

The attachment portion 136 of may be selectively mated to and received within an opening of the connecting member 120. In one embodiment as shown in FIG. 3A, a terminal end 133 of the attachment portion 136 may include a curved, conical, and/or tapered portion to facilitate positioning of the coupler 130 into the connecting member 120. In a similar manner, the coupler body 132 may include a cooperating slope or taper to further simplify the engagement therebetween. The coupler 130 and the connecting member 120 (as well as the receiving member 200) may each have complementary shaped configurations. For example, the shape of a horizontal cross section of the attachment portion 136 may be specially formed to receive the receiver and include a particular orientation (e.g., an oval, a straight-edged portion or portions, a tab or cutout, etc.).

As shown in FIGS. 3B-3E, the coupler body 132 may include rounded or curve shaped transition portion 135 to blend with and be securely supported by the coupler body 132. In some embodiments, the transition portion 135 may allow the attachment portion 136 to maintain its structural orientation relative to the receiving portion 138. The transition portion 135 may include ridges that extend from the receiving portion 138 and may be formed along either side of the attachment portion 136. The coupler body 132 may be a rigid metal such as a casted material. The coupler 130 may be joinable to ASTM A500 steel tubing via welding to create a permanent joint with various lengths of receiving member 210.

The receiving portion 138 of may be selectively mated to and received within an opening of the receiving member 210. In one embodiment, the receiving portion 138 may be shaped as a male tube end. The receiving portion 138 of the coupler 130 may be inserted within the receiving member 210 as illustrated by FIG. 3D.

In some embodiments shown in FIGS. 3D and 3E, the receiving member 210 may include an elongated neck portion 212, a protruded edge portion 214 and an aperture 216. The elongated neck portion 212 may be positioned in proximity to the receiving portion 138. The elongated neck portion 212 may of a configuration to allow the receiving portion 138 of the coupler 130 to be coupled and remain in a secured position. The protruded edge portion 214 may be positioned opposite from the protruded edge portion 214 of the receiving member 210 and with any appropriate shape to facilitate attachment to a hitch accessory (not shown). The aperture 216 may be formed through the receiving member 210 and may be shaped and sized to accept a pin to lock the hitch accessory within the receiving member 210. The aperture 216 may extend through both sides of the receiving member 210. The aperture 216 may include a key slot shape having a generally circular orientation with opposing notches about the perimeter.

The receiving member 210 may be formed from any appropriate material, including without limitation, steel or the like. In some embodiments, the receiving member 210 may be monolithically formed such as through a molding or bonding process, or may be formed in components that may be attached such as through sonic welding, fastening, adhering or the like. The receiving member 210 may be of any appropriate configuration and is not limited to that shown and described herein.

A hitch accessory, such as for example a hitch bar, may be selectively inserted into and mated with the receiving member 210. The hitch accessory (not shown) may be a generally conventional configuration that is selectively coupled to a towed vehicle such as a ball mount, clevis, or other coupling arrangement. The hitch accessory may be attached to the receiving member 210 with a hitch pin assembly 220 that extends through apertures 216 in the receiving member 210 and hitch accessory. As way of a non-limiting example, the receiving member 210 may be configured as a class I hitch, a class II hitch, a class III hitch, a class IV hitch, or a class V hitch.

The hitch accessory may be used in applications for luxury SUVs and high end vehicles where there is aesthetic or ornamental feature for premium appearance. Such accessories may include features with anti-rattle pin features. An example of such accessories may include a bike rack (hitch mounted version), a basket, a tray or the like.

In one embodiment as shown in FIGS. 4A-4E, the receiving portion 138 may further include an expanded portion 139. The expanded portion 139 may be shaped to correspond to the shape of the receiving member 210. In various embodiments, the expanded portion 139 may include a cooperating square or rectangular tube shape that cooperates to form a male-female connection between the receiving portion 138 and the receiving member 210. These shapes may conform to standardized dimensions to allow for the selective use of other towing components when the assembly is not installed.

The receiver member 210 may be provided at various lengths in order to optimize placement of the aperture relative to the fascia of the vehicle. Further, the coupler body 132 may be formed to accommodate various sizes of receiver members 210 including sizes 1.25 inches and 2 inches that may be used between each applicable ranges and classes of towing hitches. The attachment portion 136 of the coupler body 132 may then be inserted into a receiver coupler or sleeve that may be permanently or rigidly attached to the frame of the towing vehicle.

The receiver member 210 may further include a plurality of pairs of key slot apertures 216 (not shown) that may be positioned along a portion of the length of the receiver member 210. Still further, the plurality of pairs of key slot apertures 216 may be positioned on any appropriate portion of the receiver member 210 and are not limited to be on the sides or limited to be opposite from one another. The receiver member 210 may be selectively positioned relative to the receiving portion 138 such that one of the plurality of pairs of key slot apertures 216 of the receiver member 210 may generally align with apertures of the hitch accessory.

Figure 5:
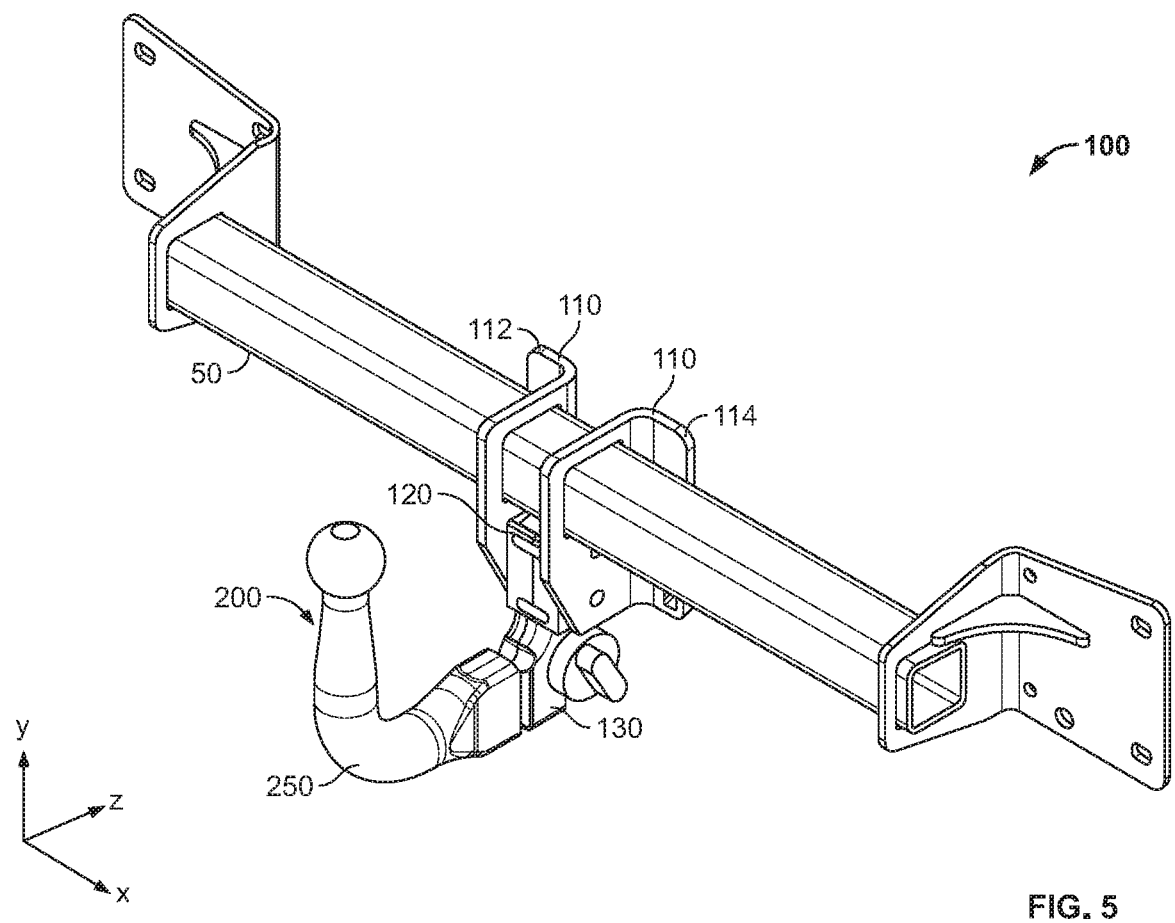
FIG. 5 is a perspective view of a towbar with a hitch adaptor system incorporating a detachable hitch ball in accordance with one embodiment of the present disclosure.

Alternatively, as illustrated by FIG. 5, the detachable receiving device 200 may be a hitch ball member 250 coupled with the coupler 130 of the present disclosure.

Figure 6A:
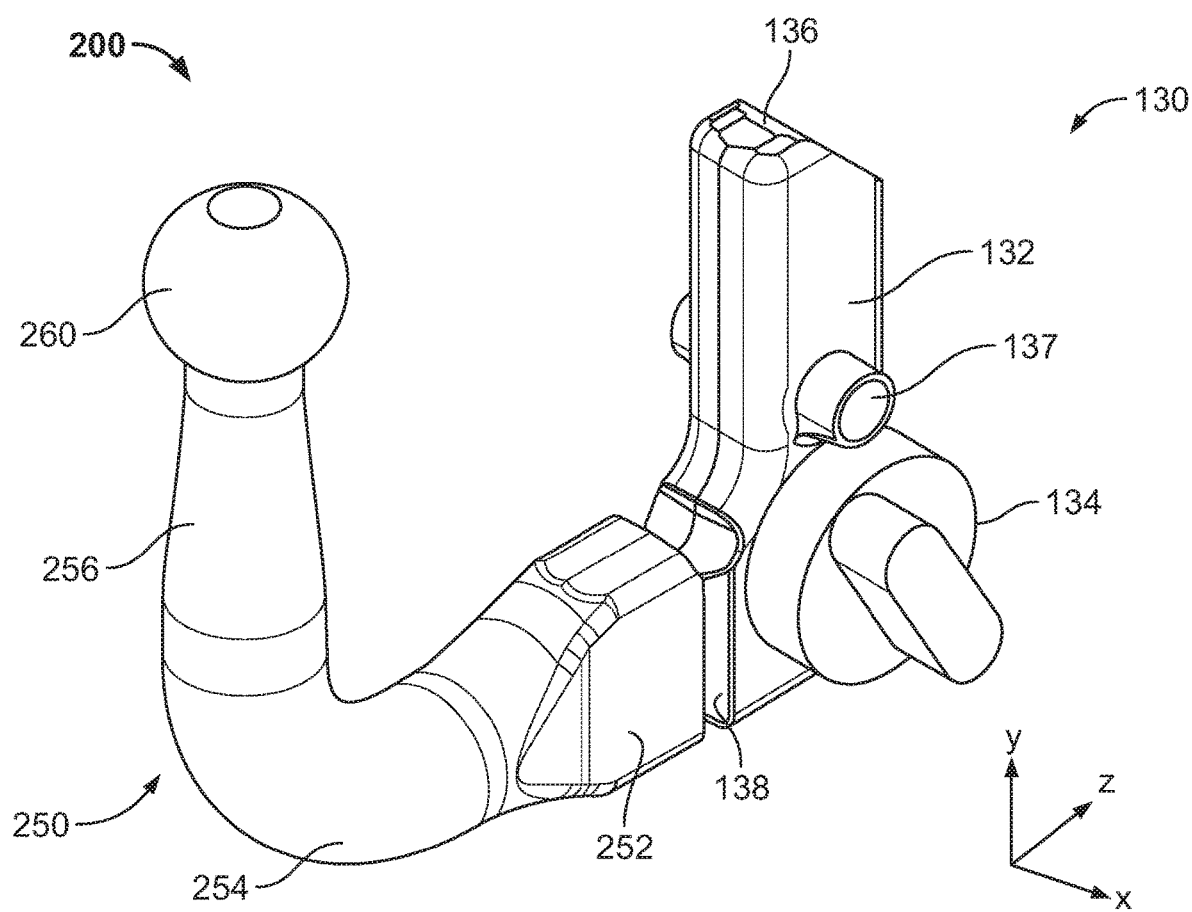
FIG. 6A is a perspective view of one embodiment of the detachable hitch ball and a coupler of the embodiment of FIG. 5.
Figure 6B:
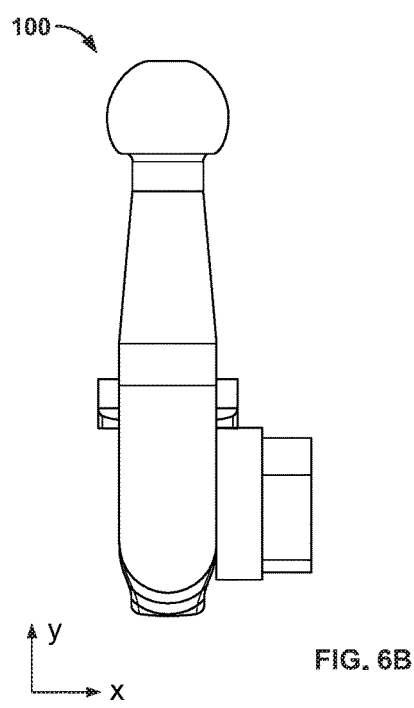
FIG. 6B is a front view of the embodiment of FIG. 6A.
Figure 6C:
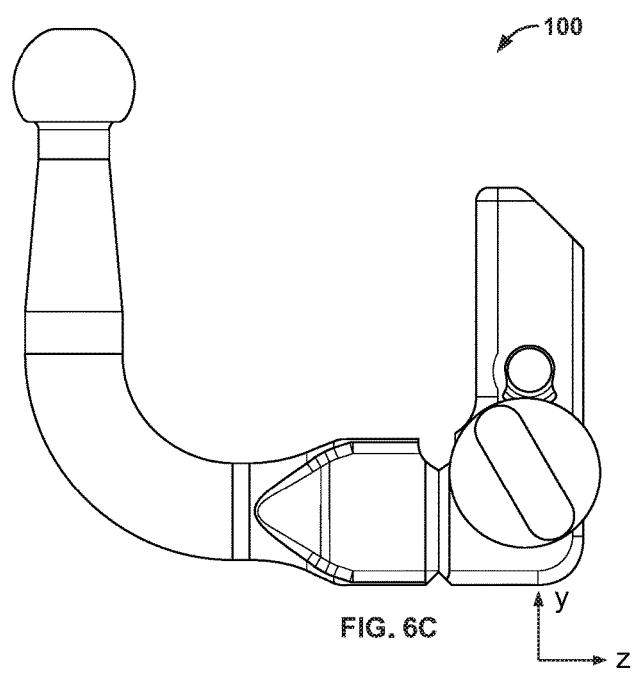
FIG. 6C is a side view of the embodiment of FIG. 6A.

Referring to FIG. 6A, the hitch ball member 250 may include an engaging portion 252, a mid-portion 254, a ball-receiving portion 256 and a hitch ball 260. The ball-receiving portion 256 may also include a ball-engaging portion 258. The hitch ball member 250 may be of any appropriate shape, such as a general L-shape whereby it may have two ends extending outwardly from the mid-portion 254. By way of a non-limiting example, the mid-portion 254 and the ball-receiving portion 256 of the hitch ball member 250 may also be a generally round cross-sectional shape. The present teachings, however, are not limited to this configuration.

Figures 6D, 6E:
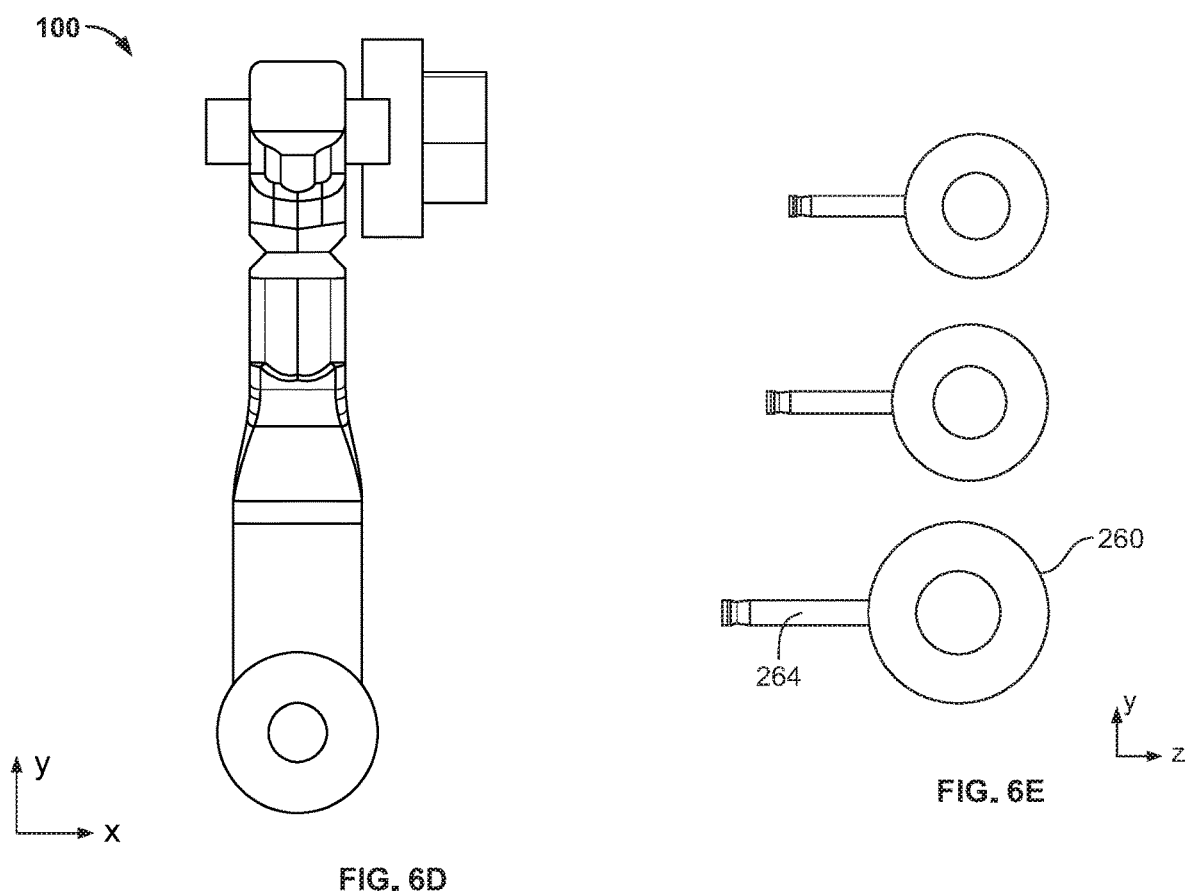
FIG. 6D is a top view of the embodiment of FIG. 6A.
FIG. 6E is top views of exemplary embodiments of the detachable hitch ball of the embodiment of FIG. 6A.

Disclosed herein the hitch adaptor system 100 is configured to allow various hitch balls 260 to be selectively attached to the hitch ball member 250. The hitch balls 260 may include different sizes and shapes such as for example shown in FIG. 6E. However, this disclosure is not limited to this feature as the hitch ball member 250 may also include a hitch ball that is monolithically attached to the L-shaped body. In one embodiment, the hitch ball 260 may be replaced without replacing the hitch ball member 250 at the underside of a vehicle or as needed by the user. In present disclosure, the hitch ball 260 may include various diameters in order to optimize the European style ball mounts of the vehicle. In such embodiment, the ball-engaging portion 258 may be formed to accommodate various sizes of hitch balls 260 such as for example including sizes 1⅞ inches and 2 inches that may be used between each applicable class ranges.

Figure 7:
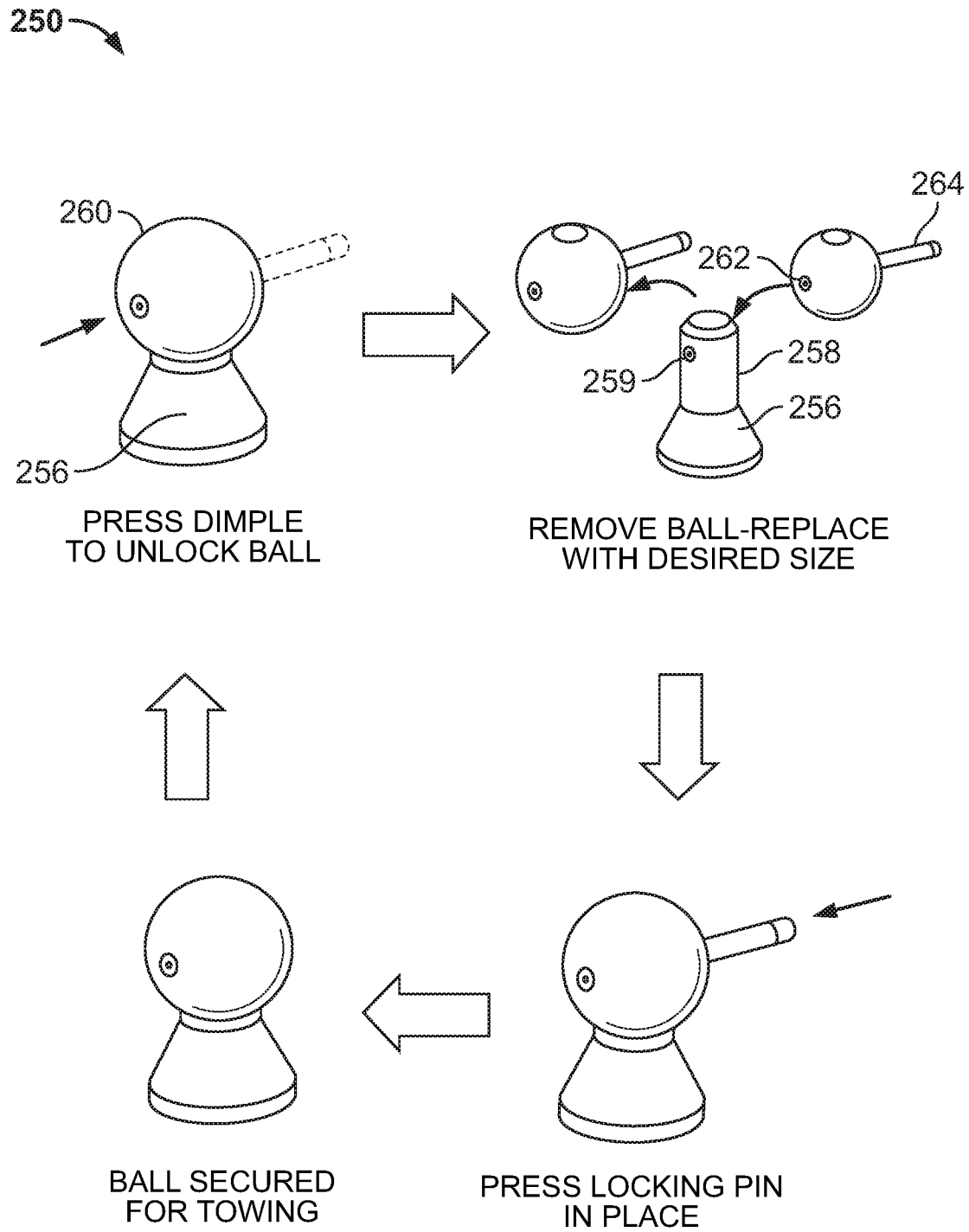
FIG. 7 are perspective views of embodiments of the detachable hitch balls with receiver members in accordance with the present disclosure.

With respect to FIG. 7, the hitch ball 260 may be selectively secured to the ball-receiving portion 256 of the hitch ball member 250. The hitch ball 260 may further include a ball-locking aperture 262 and a ball-locking pin 264. The hitch ball 260 may be of any appropriate shape, such as generally circular, oval, or the like, so as that it may generally add stability to the hitch ball member 250 of the towbar with a hitch adaptor system 100.

The hitch ball 260 may be coupled with the ball-receiving portion 256 by the ball-locking pin 264. The ball-receiving portion 256 may include a ball-receiving aperture 259 through which the ball-locking pin 264 may operatively pass. The ball-receiving aperture 259 may be of a generally round shape and may be of a size that is similar to the size of an outer diameter of the ball-locking pin 264. However, the ball-receiving aperture 259 is not limited to being round. It may also be rectangular, square or any other appropriate shape.

In operation shown in FIG. 7, the ball-locking pin 264 may be selectively engaged with and disengaged from the ball-locking aperture 262 and the ball-receiving aperture 259. The hitch ball 260 may be disengaged from the ball-receiving portion 256 of the hitch ball member 250 so that the user may replace the hitch ball 260 by disengaging the ball-locking pin 264.

Figure 8A:
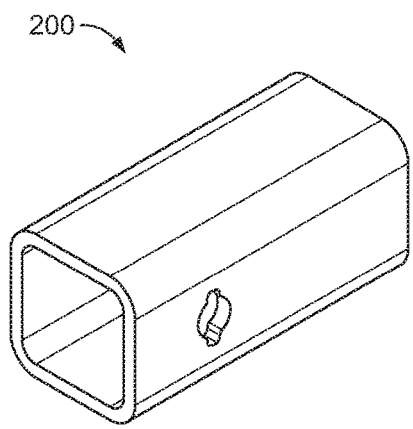
FIGS. 8A-8C are exemplary views of one embodiment the receiver member.
Figure 8C:
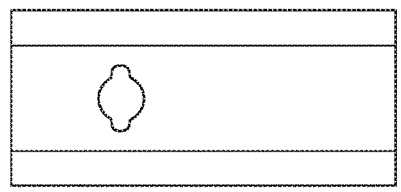
Figure 8B:
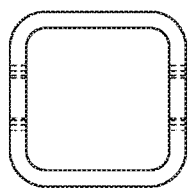

Referring to FIGS. 8A-8C, provided are exemplary views of one embodiment the detachable receiving device 200 wherein the device is a receiving member 210.

Figures 9A, 9B, 9C:
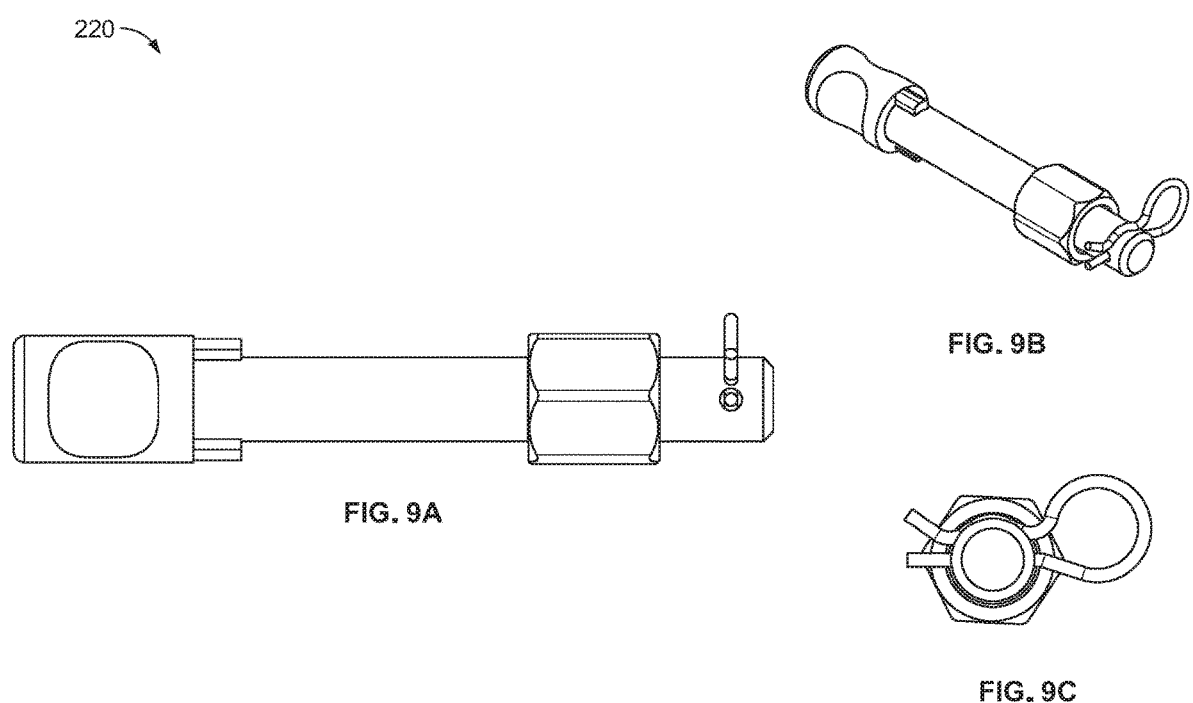
FIGS. 9A-9C are exemplary views of one embodiment a pin assembly.
Figure 11A:
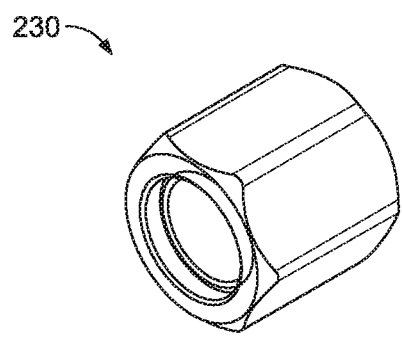
FIGS. 11A-11D are exemplary views of one embodiment a pin nut of the pin assembly.
Figure 11C:
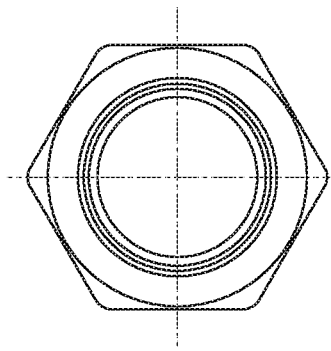
Figure 11B:
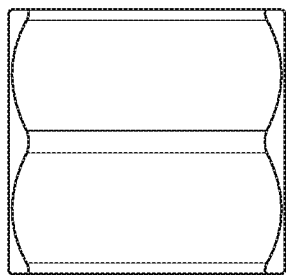
Figure 11D:
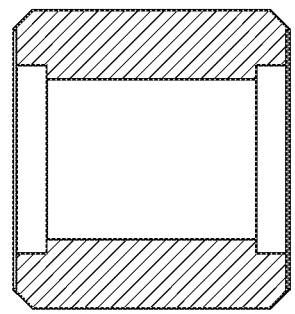

Referring to FIGS. 9A-9C, provided are exemplary views of one embodiment of the hitch pin assembly 220. The hitch pin assembly 220 may further include a hitch pin 222, a hitch pin nut 230 and a hitch pin clip 240. Any appropriate material, such as by way of a non-limiting example, steel or the like may be extruded to form the hitch pin assembly 220.

Referring to FIGS. 10A-10C, provided are exemplary views of one embodiment the hitch pin 222 of the hitch pin assembly 220. The hitch pin 222 may include radial notches 224 positioned along a perimeter of a pin body 226. The radial protrusions 224 may be along opposite sides of the pin body 226 and may be complimentarily received by the key slot aperture 216 of the receiving member 210 wherein the protrusions 224 align with the notches of the aperture 216. Further, a pin head 228 may include recesses 270 formed along opposing sides of the pin head 228. The recesses 279 may be generally rounded or carved out portions recessed from a perimeter surface of the pin head 228. Further, the pin body 226 may include threads positioned along a distal end to receive a hitch pin nut 230. The pin body 226 may also include a thru aperture to receive the hitch pin clip 240.

Referring to FIGS. 11A-11D, provided are exemplary views of one embodiment of the hitch pin nut 230 of the pin assembly 220.

Figure 12A:
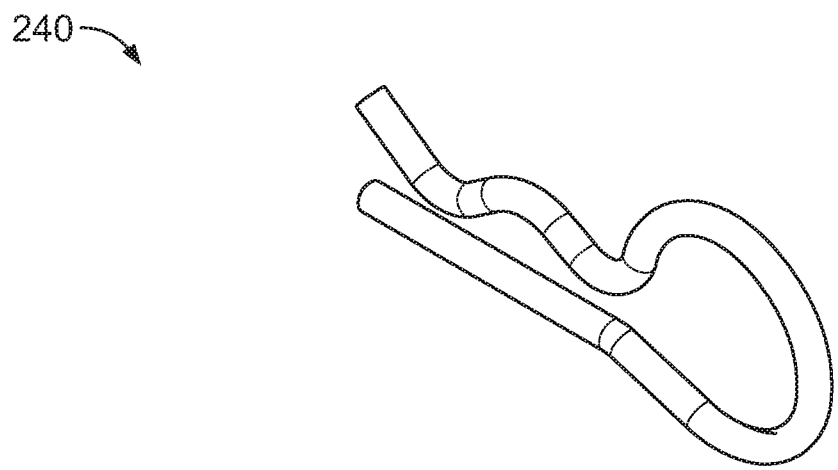
FIGS. 12A-12C are exemplary views of one embodiment a pin clip of the pin assembly.
Figure 12B:
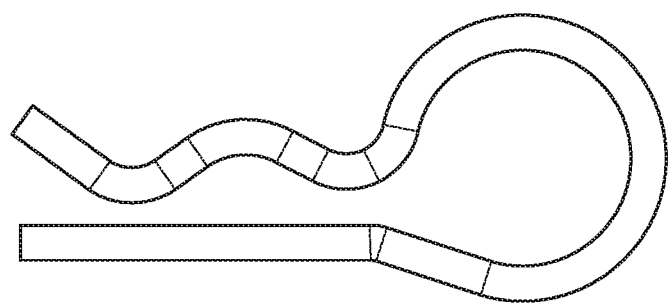
Figure 12C:
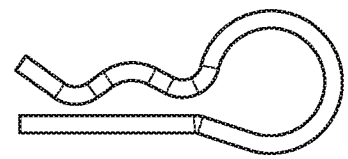

Referring to FIGS. 12A-12C are exemplary views of one embodiment the hitch pin clip 240 of the hitch pin assembly 220.

It should be understood that while the receiving member is shown and described with the towbar with a hitch adaptor system 100, any appropriate product may be attached with the towbar with a hitch adaptor system out departing from the present teachings.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A hitch adaptor system comprising:
a linkage member, the linkage member being capable of being operatively secured to a towbar, wherein the linkage member comprises a set of at least two plates, wherein the set of at least two plates is removably fastenable to the towbar;
a detachable receiving device, the detachable receiving device comprising a detachable receiving member or a detachable hitch ball member; and
a connecting member, the connecting member being operatively connected to both the linkage member and the detachable receiving device.

2. The hitch adaptor system of claim 1, wherein the set of at least two plates is removably fastened to the towbar via a plurality of fasteners.

3. The hitch adaptor system of claim 2, wherein the connecting member is removably fastened to the set of at least two plates and the plurality of fasteners.

4. The hitch adaptor system of claim 1, wherein the connecting member is permanently fastened to the linkage member via at least one weld.

5. The hitch adaptor system of claim 1, wherein the set of at least two plates each comprise at least one aperture, or opening, and wherein the connecting member is removably fastened to the set of at least two plates and the plurality of fasteners.

6. The hitch adaptor system of claim 1, wherein the linkage member operatively connects to a towbar that is affixed to a vehicle.

7. The hitch adaptor system of claim 1, wherein the detachable receiving member or a detachable hitch ball member is configured to act as a class I hitch, a class II hitch, a class III hitch, a class IV hitch, or a class V hitch.

8. A hitch adaptor system comprising:
a linkage member, the linkage member being capable of being operatively secured to a towbar, wherein the linkage member comprises a set of at least two plates removably fastenable to the towbar;
a detachable receiving device, the detachable receiving device comprising a detachable receiving member or a detachable hitch ball member;
a connecting member, the connecting member being operatively connected to the linkage member; and
a coupler, the coupler being operative connected to both the connecting member and the detachable receiving device.

9. The hitch adaptor system of claim 8, wherein the set of at least two plates is removably fastened to the towbar via a plurality of fasteners.

10. The hitch adaptor system of claim 9, wherein the coupler is removably fastened to the set of at least two plates via the plurality of fasteners.

11. The hitch adaptor system of claim 8, wherein the coupler is permanently fastened to the linkage member via at least one weld.

12. The hitch adaptor system of claim 8, wherein the set of at least two plates each comprise at least one aperture, or opening, and wherein the coupler is removably fastened to the set of at least two plates and the plurality of fasteners.

13. The hitch adaptor system of claim 8, wherein the linkage member operatively connects to a towbar that is affixed to a vehicle.

14. The hitch adaptor system of claim 8, wherein the detachable receiving member or the detachable hitch ball member is configured as a class I hitch, a class II hitch, a class III hitch, a class IV hitch, or a class V hitch.

15. The hitch adaptor system of claim 8, wherein the coupler is removably fastened to the detachable receiving device.

16. The hitch adaptor system of claim 8, wherein the coupler further comprises a locking member to permit locking of the coupler to the connecting member.

17. A hitch adaptor system comprising:
a linkage member, the linkage member being capable of being operatively secured to a towbar;

a detachable receiving device, the detachable receiving device comprising a detachable hitch ball member; the detachable hitch ball member having a detachable hitch ball;

a connecting member, the connecting member being operatively connected to the linkage member; and a coupler, the coupler being operative connected to both the connecting member and the detachable receiving device.

18. The hitch adaptor system of claim 17, wherein the linkage member comprises a set of at least two plates and wherein a plurality of fasteners removably fasten the towbar to the set of at least two plates.

19. The hitch adaptor system of claim 18, wherein the coupler is removably fastened to the set of at least two plates and the plurality of fasteners.

20. The hitch adaptor system of claim 17, wherein the coupler is permanently fastened to the linkage member via at least one weld.

21. The hitch adaptor system of claim 17, wherein the linkage member comprises a set of at least two plates each comprising at least one aperture, or opening, and wherein the coupler is removably fastened to the set of at least two plates by a plurality of fasteners.

22. The hitch adaptor system of claim 17, wherein the linkage member operatively connects to a towbar that is affixed to a vehicle.

23. The hitch adaptor system of claim 17, wherein the detachable receiving member or the detachable hitch ball member is configured as a class I hitch, a class II hitch, a class III hitch, a class IV hitch, or a class V hitch.

24. The hitch adaptor system of claim 17, wherein the coupler is removably fastened to the detachable receiving device.

25. The hitch adaptor system of claim 17, wherein the coupler further comprises a locking member to permit locking of the coupler to the connecting member.

26. The hitch adaptor system of claim 17, wherein the detachable hitch ball is removably attached to the detachable hitch ball member via at least one engagement pin configured to engage at least one aperture of the detachable hitch ball member.

\* \* \* \* \*